United States Patent Office 3,517,983
Patented June 30, 1970

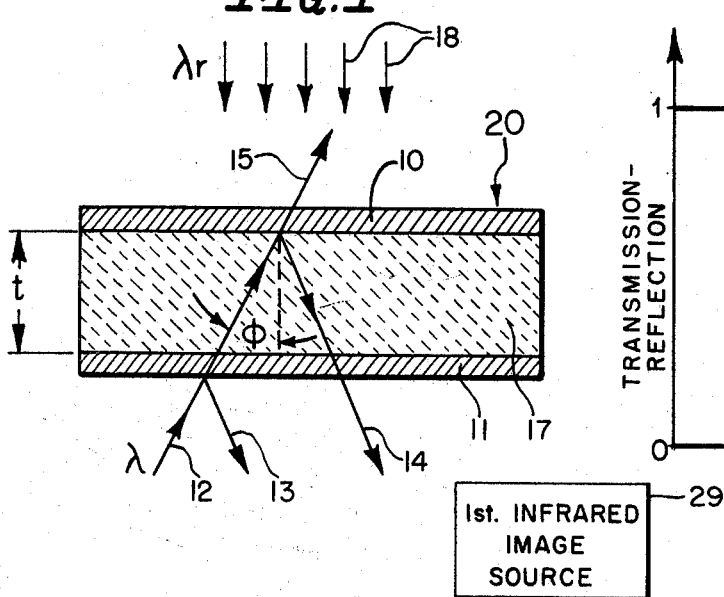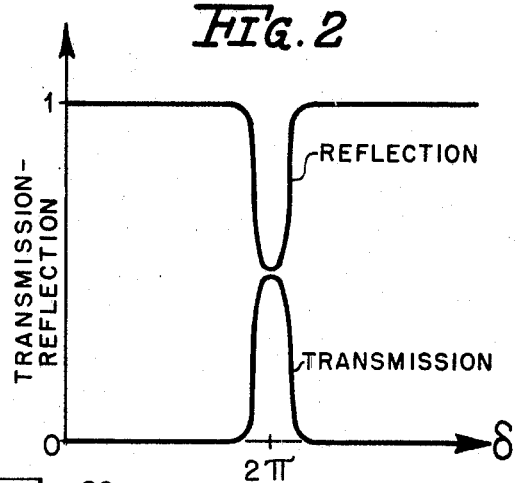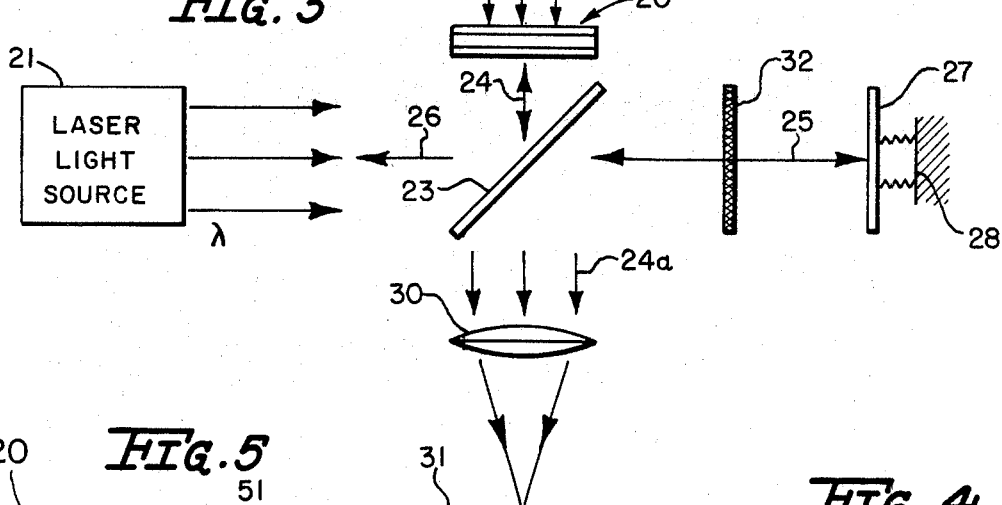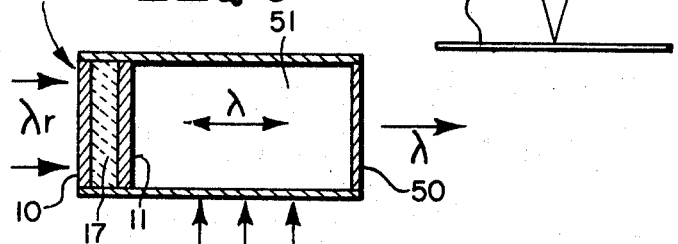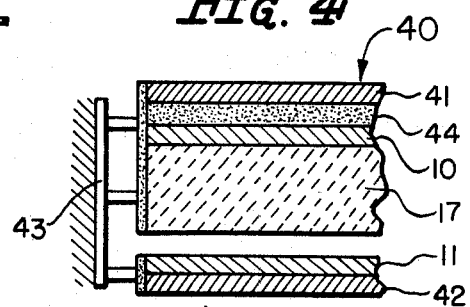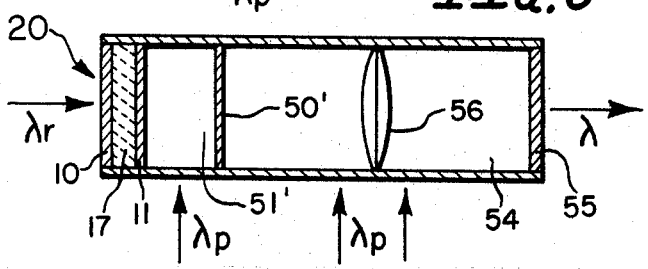

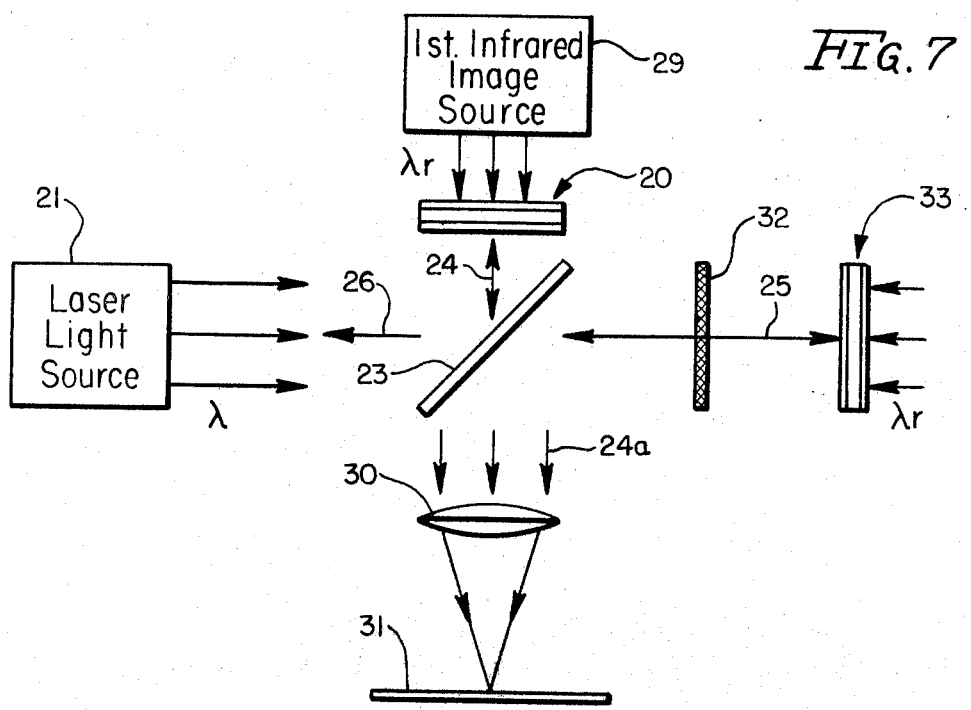
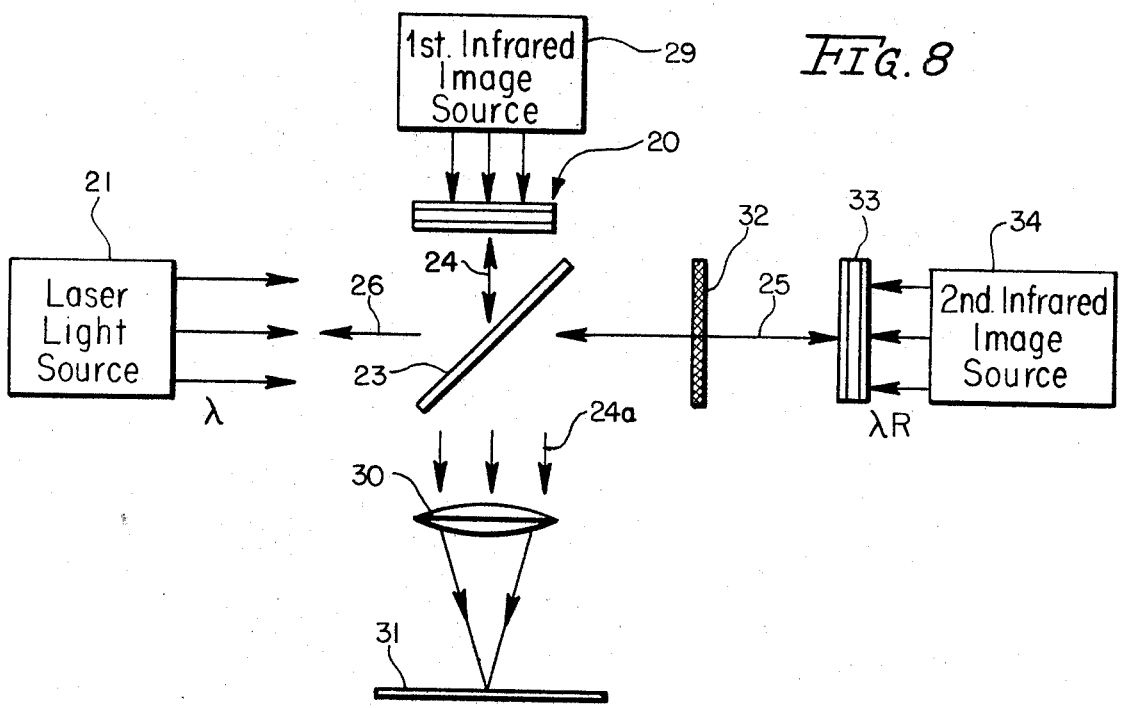

3,517,983
LIGHT CONTROL AND IMAGE
TRANSLATING SYSTEM
Michael E. Fein, Champaign, and Joseph Markin and
Alan Sobel, Evanston, Ill., assignors to Zenith Radio
Corporation, Chicago, Ill., a corporation of Delaware
Filed Dec. 6, 1966, Ser. No. 599,469
Int. Cl. G02f 1/28; H01s 3/00
U.S. Cl. 350—160
10 Claims

ABSTRACT OF THE DISCLOSURE

Actinic energy of a predetermined wavelength region controls a beam of light of a second predetermined wavelength by means of a system in which a refractive layer of material responding to the incidence of the actinic energy by local variations in its index of refraction is enclosed by a pair of at least partially reflective layers, thereby forming an interference filter. This filter is tuned to exhibit selective transmissivity of reflectivity for incident light of the second wavelength. As localized index of refraction changes and consequent optical path length changes occur in the refractive layer in response to the actinic control energy, the tuning of the filter is spatially affected and corresponding localized variations in transmissivity and reflectivity of the filter for second wavelength light occur. The actinic energy directed to the filter may be in the form of an infrared beam carrying image information and the second wavelength light may be visible light which is thereby directly impressed with the image information of such infrared beam.

The present invention pertains to a radiation system. More particularly, it relates to a system which responds to visible or invisible radiation and which takes special advantage of the properties of an interference filter to produce a representation of that radiation.

Interference filters have found special use in the field of spectroscopy. Such a filter is typically used to separate light of one wavelength from light of a mixture of wavelengths. In this manner, it has been utilized to separate and permit identification of elements by analyzing the different radiation wavelengths found to be present in the total radiation from a given source of light or other radiation.

Over a period of many years, many different techniques have been devised for translating or otherwise acting upon radiant energy, including radiant energy in the infrared, visible and ultraviolet regions of the spectrum. One particular field of active endeavor is that including image amplifiers, converters and detectors.

It is a general object of the present invention to provide a new and improved radiation system.

It is a more specific object of the present invention to provide a radiation system which takes unique advantage of certain characteristics of an interference filter.

Another object of the present invention is to provide an improved image display system, and it is a specifically related object to provide a system for sensing and displaying images conveyed by infrared energy.

A further object of one specific aspect of the present invention is to provide an improved radiation system which advantageously incorporates the properties of a laser.

Still another object of a different specific aspect of the present invention is to provide an interference filter having special characteristics particularly appropriate to certain radiation systems.

A radiation system in accordance with the present invention comprises a refractive layer of material the effective optical thickness of which for radiation of a first wavelength varies locally in response to the reception of radiation in a given wavelength region. A pair of reflective layers define an interference filter and are disposed on opposite sides of the refractive layer. At least one of the reflective layers effectively is at least partially transmissive of the given-wavelength radiation, and at least one of the reflective layers is at least partially transmissive of radiation of the first wavelength. Both of the reflective layers are at least partially reflective to the first wavelength radiation. The effective interference-filter one-way optical path length for the first-wavelength radiation between the reflective layers is in the vicinity of an integral multiple of one-half the first wavelength, and reception of the given-wavelength radiation by the refractive layer locally varies that path length.

The features of the present invention which are believed to be novel are set forth with particularity in the appended claims. The organization and manner of operation of the invention, together with further objects and advantages thereof, may best be understood by reference to the following description taken in conjunction with the accompanying drawing, in the several figures of which like reference numerals identify like elements and in which:

FIG. 1 is a diagrammatic cross-sectional view of radiation system incorporating the principles of the present invention;

FIG. 2 is a graph depicting interference filter characteristics;

FIG. 3 is a schematic diagram of a radiation system incorporating the device of FIG. 1;

FIG. 4 is a fragmentary cross-sectional view of a modified form of the device of FIG. 1;

FIG. 5 is a schematic representation of another radiation system embodying the device of FIG. 1; and FIG. 6 schematically illustrates still another radiation system incorporating the device of FIG. 1.

As is fundamental in interference filters, the primary elements in the filter of FIG. 1 are a pair of spaced reflective layers 10 and 11 aligned mutually parallel and disposed in the path 12 of incoming radiation of a first wavelength λ. While wavelength λ may be light in either the visible or invisible wavelengths, unless otherwise indicated it is hereinafter designated as a wavelength in the visible light range, since this is particularly suitable for the specific field of utility to be illustrated. As embodied in FIG. 1, both layers 10 and 11 are highly reflective of the visible light of wavelength λ, although each of the reflective layers nevertheless is transmissive of a minor portion of the visible light incident on it at a given point.

In operation, light incoming on path 12 may be immediately reflected back along path 13 upon encountering the initial reflective layer 11, may pass through reflective layer 11 and then be reflected back along path 14 by reflective layer 10, or may be transmitted also through reflective layer 10 and emerge beyond the filter on path 15. When the one-way optical path length through the filter between layers 10 and 11 is an integral multiple of one-half of wavelength λ, transmission through both layers, and hence through the filter, is maximum while reflection back along paths 13 and 14 correspondingly is minimum. On the other hand, when the optical path length is of a different value, reflection backwardly along paths 13 and 14 becomes maximum and the transmission through the filter along path 15 becomes minimum. These transmission reflection characteristics are shown in FIG. 2.

In general, the higher the reflectivity of layers 10 and 11, the sharper the peaks in the reflection and transmission curves. The abscissa in FIG. 2 is in terms of the characteristic $\delta$ which is determined in accordance with the expression $$\delta = \left(\frac{2\pi}{\lambda}\right) 2\mu t \cos \phi$$

where $\mu$ is the index of refraction of the medium 17 between reflective layers 10 and 11, $t$ is the spacing between layers 10 and 11, and $\phi$ is the angle of incidence of the light incident on layer 10. Maximum transmission occurs when $\delta = n2\pi$, where $n$ is an integer.

The schematic representation of the light paths in FIG. 1 is greatly simplified. In actual practice, light transmitted through layer 11 is reflected back and forth between layers 10 and 11 many times. Correspondingly, light is reflected back from the filter along a large plurality of paths parallel to and corresponding to illustrated path 13 and 14. The incoming light beam is of sufficient width relative to the filter thickness that all these paths are essentially superimposed or overlapping. Similarly, light emerges through layer 10 along a plurality of essentially superimposed paths parallel to illustrated path 15. It is the interference of the light among these multiple, parallel and essentially superimposed beams of light which is responsible for the wavelength-selecting properties of the interference filter. These basic principles of interference filter operation are well known, having been described in such standard references as Light by R. W. Ditchburn, Interscience Publishers, New York City, 2nd ed. (1963), pp. 121-129, 141-150, 152-154 and Introduction to Electricity and Optics, by Nathaniel H. Frank, McGraw-Hill Book Co., New York City, 2nd ed. (1950), pp. 362-370.

In accordance with the invention, the interference filter of FIG. 1 is rendered selective in its action on the radiation incoming along path 12 in response to the reception by the filter of additional radiation of wavelength $\lambda_r$ in a given wavelength region and arriving along one or more paths 18. To this end, medium 17, about which reflective layers 10 and 11 are sandwiched, has an effective optical thickness which, for radiation of wavelength $\lambda$, varies locally in response to reception of the other radiation of wavelength $\lambda_r$.

In the specifically illustrated case, refractive layer 17 is a temperature-sensitive dielectric particularly responsive to infrared radiation. Reception of the latter in any localized region of refractive layer 17 alters its effective optical thickness by changing its index of refraction in that region for the light of wavelength $\lambda$. In a typical embodiment, layer 17 is vinyl chloride-acetate or ethyl cellulose. Reflective layers 10 and 11 preferably are multiple-layer dielectric reflectors of the kind currently used as the reflectors in conventional laser cavities. In FIG. 1, the thicknesses are greatly exaggerated. Because of the physically short distance of one light wavelength, layers 10, 11 and 17 actually may be exceedinly thin and the entire package quite compact.

In operation, absorption of the infrared energy along any one of paths 18 changes the index of refraction in the region of infrared reception by refractive layers 17. Changing the index of refraction has the same effect as an actual change in the thickness of this region of layer 17, and hence of the reflector spacing in that region, so as correspondingly to change the one-way optical path length between the reflectors. Stated another conventional way, the infrared energy changes the tuning of interference filter 20 in that region. Reception of the infrared energy also results by thermal expansion in a slight local change in the actual physical thickness of refractive layer 17 and this has a similar effect upon the wavelength of maximum transmission. Thus, when filter 20 is illuminated by monochromatic visible radiation incident upon reflective layer 11, and the wavelength of this illumination is chosen to be near at or at the peak of the transmission response curve of FIG. 2, or alternatively is in an area where the slope of that curve is steep, a small change in the effective index of refraction causes a large change in both the transmission and reflection of the visible light.

Because the visible light is multiply reflected in the filter many times by virtue of the high reflectivity of layers 10 and 11, the effect of even a very small change in the effective optical thickness is enhanced. Consequently, filter 20 acts in response to the incident infrared energy to modulate the visible radiation. The modulated radiation may be viewed from either side of filter 20, thus giving a choice of observing either the effect upon the reflected light or the complementary effect upon the transmitted light. Whether the reflected or transmitted ligh is viewed, the observation is of light educed from filer 20 and the term "educed" is utilized herein with that definition.

Further in accordance with an interesting application of the inventon, the infrared energy incoming along paths 18 is in the form of an image focused on filter 20. At the same time, the output visible light educed from filter 20 is translated through a conventional lens system which focuses that light so as to provide an image of the filter. In consequence, local changes over the area of filter 20 in infrared radiation intensity produce local changes in the visible light output of the filter. That is, an incoming infrared image is converted to a visible image.

Under some circumstances, it may be preferable that the background visible output from filter 20 under the no-image condition be at the level of maximum eye sensitivity. To this end, FIG. 3 depicts an arrangement in which filter 20 is incorporated into a two-beam interferometer which functions as an optical bridge circuit. The condition of balance is determined by the infrared radiation falling on the interefrence filter which serves as one arm of the bridge. As shown, the arrangement of FIG. 3 will be recognized as that which is known as the Michelson interferometer.

Incoming infrared radiation is in the form of an image focused on filter 20, as in the case of FIG. 1, and emanates from a first infrared image source 29. Monochromatic, coherent visible light of wavelength $\lambda$ is directed by laser light source 21 in a collimated beam upon a mirror 23 which is partially transmissive and partially reflective of the visible radiation. Consequently, a portion of the visible light is reflected along a first path 24 to illuminate filter 20 while the remainder continues on along a second path 25. At the same time, mirror 23 receives visible light educed from filter 20 and transmits a portion thereof on along an extension of path 24 represented by arrows 24a, while returning the remainder back toward the original source of the visible light along a path 26. Disposed across path 25 is a second mirror 27 secured to a support 28 in a manner permitting adjustment of the spacing between mirrors 23 and 27. Mirror 27 reflects the light in path 25 back to mirror 23 where a portion of that reflected-back light is reflected along first path extension 24a and the remainder is transmitted through mirror 23 back along path 26. A lens 30 focuses the combined light traveling along first path extension 24a onto a viewing surface 31, the lens system being selected to project an image of the radiation educed from filter 20 onto the viewing surface. Also included in path 25 between the two mirrors is an adjustable-density filter 32 which in its simplest form is selected to have a uniform density gradient from one end to the other end is capable of being moved laterally to path 25 to selectively control the amplitude of the light in path 25 which is passed. Alternatively, when the incoming light of wavelength $\lambda$ is polarized, filter 32 may simply be a polarization filter rotatable about path 25 to control the light amplitude. Such polarization is typical of the light produced by certain gas lasers.

In operation with no infrared input, the amount of filtering interposed by amplitude filter 32 and the position of mirror 27 may be adjusted so that the amplitude and phase of the portion of the visible light in path extension 24a arriving by way of mirror 27 is equal to the amplitude and opposite the phase of the light portion in path extension 24a educed from filter 20. Consequently, the two portions cancel in the absence of the reception of infrared radiation by interference filter 20 and viewing surface 31 is dark. The subsequent reception of an infrared image by interference filter 20 perturbs the visible light pattern educed from the interference filter to create a pattern of visible light on viewing surface 31 corresponding to the infrared image received by the system. With different adjustments of the amplitude and phase of the light reflected from mirror 27, the background illumination on screen 31 may have any desired magnitude in the absence of infrared radiation incident on filter 20.

It will be observed that the system functions continuously and simultaneously for image points spread throughout the receiving surface of interference filter 20 and that the image pattern is observable by the human observer without further electronic or chemical processing. The device exemplifies both simplicity and fast response and no scanning is necessary. Because the duty factor of each image element is unity, as contrasted with image scanners where it is the inverse of the number of image elements, the system exhibits an improved signal-to-noise ratio, other things being the same.

The same principles of operation may be incorporated into a similar interferometer system in which interference filter 20 is operated in the transmission mode rather than the reflection mode. However, it is preferred to utilize the reflection mode so that the infrared and visible images are received or formed on opposite sides of the filter. In either case, the local action of the received infrared radiation is effectively to change the optical thickness and consequently alter the local operating point on the response curve of FIG. 2. The nominal no-signal operating point may be set to the peak of the reflection curve, although sensitivity may be greatest when a point on the curve is chosen which exhibits a maximum rate of change of reflection with change in index of refraction.

The FIG. 7 system is a modification of the FIG. 3 system wherein mirror 27 is replaced with a second interference filter 33 like filter 20. In one use of this modification, the two filters both respond to the same common background radiation or infrared ambient and act in the same way upon the respective portions of the visible light they each reflect. In this way, the system is compensated for changes in ambient temperature. The FIG. 8 system is a modification of the FIG. 7 system wherein a second image is borne by incoming infrared radiation $\lambda_R$ emanating from a second infrared image source 34 and is caused to fall upon the interference filter 33 serving as mirror 27, and the system then functions as an image correlator.

In order to improve the thermal sensitivity of refractive layer 17 and to minimize its thermal inertia, it is contemplated in accordance with one alternative to construct the interference filter in a modified form 40 as shown in FIG. 4 so that refractive layer 17 has one of its major surfaces free. To this end, refractive layer 17 and reflective layer 10 are commonly supported from a first substrate 41, while reflective layer 11 is supported from a second substrate 42 in a manner such that it is physically spaced from the near surface of refractive layer 17. Completing the assembly, both substrates 41 and 42 are commonly supported from a rigid base 43. An additional layer 44 of thermally-absorbing material preferably is included between substrate 41 and reflective layer 10 in order to maximize the localized absorption of the incoming infrared radiation and conduct it efficiently to refractive layer 17. With suitable selection of materials, substrate 41 and layer 44 may be interchanged or their functions combined into a single layer.

The particular mode of construction illustrated in FIG. 4 is also advantageous in that it permits the use of materials for the different layers which are not self-supporting or which cannot be fabricated to optical tolerances but can be grown or deposited with optical flatness. It also makes possible the use of materials which cannot be properly processed under high vacuum conditions. For example, known coating techniques, whereby thin films of material are floated off the surface of a liquid, may be used to deposit the materials onto the substrates. Thus, high-vacuum deposition techniques may be utilized to lay down and form reflective layers 10 and 11, while a thermally-sensitive layer 17 of an organic or other material having a high vapor pressure is deposited by atmospheric pressure techniques upon reflective layer 10. As in the case of FIG. 1, reflective layers 10 and 11 preferably are multiple-layer dielectric coatings. These multiple-layer coatings may be designed to maximize infrared absorption and help to assure that most of the absorption takes place in the element which is used to detune (or tune) the visible-wavelength interference frequency of the filter.

FIG. 5 illustrates an additional application of interference filter 20. In this case, the filter is incorporated as one of the mirrors of an optically resonant cavity 51 also defined by a second mirror 50. In this case, cavity 51 is filled with a medium, such as a ruby crystal, capable of lasing. The system also includes a source of pumping energy in the form of light of wavelength $\lambda_p$ which is directed into cavity 51 along paths 52. The pumping energy creates laser action in cavity 51 in the now conventional manner.

In operation, the laser produces light of wavelength $\lambda$ and mirror 50, though highly reflective of that light, is just sufficiently transmissive thereof to permit the coherent output beam of light to emerge in the usual manner on the occurrence of laser action in cavity 51. The level of pumping radiation $\lambda_p$ and the reflectivities of mirror 50 and filter 20 are such that in response to pumping along the laser operates just below the condition of self-oscillation in the absence of infrared radiation $\lambda_r$ upon interference filter 20. With respect to response curve of FIG. 2, filter 20 is designed so that the incident infrared radiation increases the reflectivity of interference filter at wavelength $\lambda$ to the point that lasing occurs within cavity 51. Thus, the change in reflectivity of the interference filter alters the gain of the laser itself. As an alternative, mirror 50 may be totally reflecting and the laser light may be extracted from interference filter 20.

In this system, it is preferred that the laser have well-defined and separable axial modes or that an optical system be included so that the interference filter is imaged upon output mirror 50; alternatively, laser configurations are known in which such imaging is accomplished by the active lasing medium itself. Although, the output light through mirror 50 or filter 20 is monochromatic, the input radiation may have wavelengths over a finite range the width of which depends upon the bandwidth of infrared sensitivity in filter 20. It is preferred that the gain of the laser system itself be low, so that it acts in a proportional mode in which the light output is nearly a linear function of the incident infrared intensity.

In a further modification of the FIG. 5 system as shown in FIG. 6, the interference-filter lasing-gain controlling function is confined to a part of the total lasing system. In this arrangement, cavity 51' and second mirror 50', together with interference filter 20, operate in a manner similar to the lasing system of FIG. 5. The active material in cavity 51' may be a thin sheet, and mirror 50' may be coated upon one surface of this sheet. The remainder of the system includes a second cavity 54 and an output mirror 55 together with an optical system in a form of a lens 56 which images mirror 50' upon mirror 55. Alternatively, a mirror-type optical system may be substituted for lens 56. On the other hand, interference filter 20 and mirror 50' preferably are sufficiently close together that no lens or other imaging arrangement is required in order to image the interference filter onto mirror 50'.

In operation, receipt of the infrared radiation in interference filter 20 effects control of the localized lasing action in the first low-power lasing system of cavity 51′. This system in turn is used to control the gain and output of the higher-gain lasing system including cavity 54.

Axial separability of the laser action is alternatively achievable in other ways. For example, lasers have been demonstrated utilizing glass fibers. By employing bundles of the fibers in the laser light path, each fiber may define one axial mode and the plurality of modes are well separated. In an equivalent approach incorporating a gas laser, similar mode separation is obtained by including a plurality of small tubes in the light path. To implement this technique, it is envisioned to employ the clusters of fibers or tubes as the active laser material or container in systems otherwise like those illustrated in FIGS. 5 and 6. In effect, each such fiber or similar element constitutes a separate laser. In such a system, lens 56 of FIG. 6 becomes unnecessary.

In a different arrangement which avoids any difficulty with the different axial modes of a laser, the interferometer system of FIG. 3 is employed as one of the two reflectors defining the optically resonant cavity of a laser. Path 26 then represents the optical axis within an active laser medium and the other reflector of the laser cavity is disposed on path 26 spaced from mirror 23. In operation, the combination of interference filter 20, mirror 23 and mirror 27 together defines the one reflector of the laser cavity. The input and output radiation paths are the same as shown in FIG. 3, and the imaging process occurs in a manner the same as was described with respect to FIG. 3. Another advantage of this particular arrangement is that the portion of the light returning on path 25 which passed through mirror 23 and on along path 26 is returned within the laser cavity where it contributes to the continued laser action. Consequently, the overall system may exhibit greater efficiency, resulting in a brighter ouput image for a given laser power.

The disclosed apparatus enables either radiation modulation or image conversion. It is of particular interest as embodied in the form of an infrared converter. The received infrared radiation modulates or controls the illuminating visible light by causing a local change in the effective optical thickness of the interference filter. The actual change in the tuning of the interference filter may be the result in whole or in part of basic parameter alterations other than the actual physical thickness of a material element and illustratively is a local change in its index of refraction. On the other hand, the actual physical thickness may be changed locally by thermal, electrostrictive, mechanical, acoustical or magnetic energy.

By virtue of the fact that the incident visible light makes many transits through the controlling layer of the filter, its own control gain is very high. In combination with other apparatus, such as when utilized in a laser system, high sensitivity is achieved because the filter need only introduce a small shift in optical path length to cause a major change in total light transmission or reflection observed. Where the controlling or refractive layer is part of an active laser or the like, the change in optical path length not only may govern the gain of the laser but it permits the laser oscillation to be turned on and off. In this latter environment, the systems may operate as image amplifiers, converters or intensifiers.

While a particular embodiment of the invention has been shown and described, it will be obvious to those skilled in the art that changes and modifications may be made without departing from the invention in its broader aspects and, therefore, the aim in the appended claims is to cover all such changes and modifications as fall within the true spirit and scope of the invention.

We claim:
1. A radiation system comprising:
   a refractive layer of material the effective optical thickness of which for radiation of a first wavelength varies locally in response to the reception of radiation in a given infrared wavelength region;
   a pair of reflective layers defining an interference filter and disposed on opposite sides of said refractive layer at least one of which effectively is at least partially transmissive of said given-wavelength radiation, at least one of which is at least partially transmissive of radiation of said first wavelength, and both of which are at least partially reflective to said first-wavelength radiation, the effective interference-filter one-way optical path length for said first-wavelength radiation between said reflective layers being in the vicinity of an integral multiple of one-half said first wavelength with the reception of said given-wavelength radiation by said refractive layer locally varying said path length;
   a partially reflective and partially transmissive first mirror spaced from said interference filter and so disposed at an angle thereto as to transmit a portion of said first wavelength radiation educed from said filter along a first path away from said filter and to reflect the remaining portion along a second path;
   means for directing a collimated beam of monochromatic radiation of said first wavelength along said second path onto said mirror with the latter reflecting a portion thereof onto said filter and transmitting the remaining portion along a third path;
   and a second mirror, comprising an additional interference filter essentially like the first, reflective of said first wavelength radiation disposed across said third path and adjustably spaced from said first mirror for reflecting at least part of the portion of said beam transmitted through said first mirror back thereto with said first mirror reflecting a portion of said reflected-back beam portion along said first path.

2. A system as defined in claim 1 in which said additional interference filter is responsive to ambient radiation commonly received by both filters for acting on said reflected-back beam portion in a manner compensatory to the action of the other filter, on said first-wavelength radiation transmitted therefrom along said first path, in response to said ambient radiation.

3. A system as defined in claim 1 which further includes first and second sources of said given wavelength radiation representative respectively of first and second images directed individually upon respective ones of said filters.

4. A light-controlling system comprising:
   an interference filter comprising a substrate of a material whose index of refraction varies with irradiation by actinic energy of a first predetermined wavelength region interposed between a pair of at least partially reflective layers, said interference filter being tuned to exhibit selective transmissivity or reflectivity for incident light of a second predetermined wavelength;
   means for projecting incident light of said second predetermined wavelength on said interference filter;
   and means for irradiating said substrate with actinic energy of said first predetermined wavelength to vary its index of refraction and thereby modulate the transmissivity or reflectivity of said interference filter for incident light of said second predetermined wavelength.

5. An image-translating system comprising:
   an interference filter comprising a substrate of a material whose index of refraction varies with irradiation by actinic energy of a first predetermined wavelength interposed between a pair of at least partially reflective layers, said interference filter being tuned to exhibit selective transmissivity or reflectivity for incident light of a second predetermined wavelength different from said first wavelength;
   means for projecting incident light of said second predetermined wavelength on said interference filter;
   and means for irradiating said substrate with a control beam of actinic energy of said first pretermined wavelength, said control beam being space modulated with image information and vary locally the index of refraction of said material correspondingly, thereby causing the tuning of said interference filter and its transmissivity and reflectivity for incident light of said second wavelength to be spatially modulated in accordance with said image information.

6. An image-translating system as in claim 5, wherein said control beam of actinic energy comprises infrared radiation and said light of a second predetermined wavelength comprises visible monochromatic light.

7. A system as in claim 5, wherein said interference filter exhibits a response curve defining a significant peak in reflection response and said second wavelength is of a value corresponding to a steeply sloping portion of said peak, said means for irradiating said substrate with a control beam is oriented so that said beam is incident upon one of said reflective layers and is at least partially transmitted therethrough to said substrate and said means for projecting light of said second predetermined wavelength is oriented to project a beam of said light on the other of said layers, said incident beam being substantially reflected from said filter, said spatially modulated control beam correspondingly modulating said reflected light, and said system thereby operating in a reflection mode.

8. An image translating system as in claim 5, wherein:
said means for projecting light of said predetermined second wavelength directs a flood beam of said light upon said filter;
said reflective layers are separated by a distance such that the one-way optical path length between said layers for said flood beam light incident upon said filter at a predetermined angle of incidence is an integral multiple of one-half the wavelength of said light; and
said space-modulated control beam varies in intensity over its cross-sectional in accordance with said image information to correspondingly vary locally the index of refraction for said flood beam light of said material over its area, said optical path length between said reflective layers varying with said index of refraction variation thereby spatially modulating said flood beam with said image information.

9. An image translating system as defined in claim 7, wherein said interference filter peak response corresponds to full reflection and said second wavelength is of a value substantially corresponding to the maximum amplitude of said peak;

and in which said means for projecting light of said second predetermined wavelength on said interference filter comprises:
a reflector spaced from said interference filter and defining therewith a cavity optically resonant at said second wavelength;
a laser medium disposed between said reflector and said filter to produce light of said second wavelength;
and a source of energy for supplying activating pump power to said medium to set off lasing oscillations within said cavity, said lasing oscillations being thereby spatially modulated with said image information by the action of said interference filter.

10. An image translating system as defined in claim 9, wherein:
said space modulated control beam varies in intensity over its cross section in accordance with said image information;
said reflector is partially transmissive of said second wavelength light;
the lasing gain of said medium filter, and reflector is sufficiently low to permit proportional mode lasing within said cavity;
and said lasing oscillations are thereby both spatially and gain controlled to emit light of said second wavelength bearing said image information from said partially transmissive reflector.

References Cited

UNITED STATES PATENTS

| | | | |
|---|---|---|---|
| 2,824,235 | 2/1958 | Hahn et al. | 250—83.3 |
| 3,243,722 | 3/1966 | Billings | 331—94.5 |
| 3,365,678 | 1/1968 | Maurer | 331—94.5 |
| 3,379,998 | 4/1968 | Soules et al. | 331—94.5 |
| 3,385,927 | 5/1968 | Hamann | 178—7.5 |

FOREIGN PATENTS 26,669  5/1930  Australia.

RONALD L. WIBERT, Primary Examiner

P. K. GOODWIN, JR., Assistant Examiner

U.S. Cl. X.R.

331—94.5; 250—83.3